(12) United States Patent
Willner et al.

(10) Patent No.: US 7,746,450 B2
(45) Date of Patent: Jun. 29, 2010

(54) FULL-FIELD LIGHT DETECTION AND RANGING IMAGING SYSTEM

(75) Inventors: Christopher Allen Willner, Rochester, MI (US); James McDowell, Rochester Hills, MI (US)

(73) Assignee: Science Applications International Corporation, San Diego, CA (US)

( * ) Notice: Subject to any disclaimer, the term of this patent is extended or adjusted under 35 U.S.C. 154(b) by 0 days.

(21) Appl. No.: 11/845,858

(22) Filed: Aug. 28, 2007

(65) Prior Publication Data
US 2009/0059201 A1    Mar. 5, 2009

(51) Int. Cl.
G01P 3/36 (2006.01)
(52) U.S. Cl. .................... 356/28; 356/28.5
(58) Field of Classification Search ....... 356/3.01–28.5, 356/139.01–139.1
See application file for complete search history.

(56) References Cited

U.S. PATENT DOCUMENTS

| | | | |
|---|---|---|---|
| 5,751,830 A | | 5/1998 | Hutchinson et al. |
| 6,031,601 A | * | 2/2000 | McCusker et al. ......... 356/5.01 |
| 6,147,747 A | | 11/2000 | Kavaya et al. |
| 6,714,286 B1 | * | 3/2004 | Wheel ........................ 356/5.05 |
| 6,860,350 B2 | | 3/2005 | Beuhler |
| 2004/0051664 A1 | * | 3/2004 | Frank ......................... 342/457 |
| 2004/0077306 A1 | * | 4/2004 | Shor et al. .................... 455/1 |
| 2005/0278098 A1 | * | 12/2005 | Breed ......................... 701/45 |
| 2006/0119833 A1 | * | 6/2006 | Hinderling et al. ......... 356/5.11 |
| 2006/0227317 A1 | * | 10/2006 | Henderson et al. ............ 356/28 |
| 2008/0088818 A1 | * | 4/2008 | Mori ........................... 356/5.1 |

* cited by examiner

Primary Examiner—Thomas H Tarcza
Assistant Examiner—Luke D Ratcliffe
(74) Attorney, Agent, or Firm—Banner & Witcoff, Ltd.

(57) ABSTRACT

Apparatuses and methods determine positional information from a reflected optical signal for an object on a per pixel basis. A spread spectrum imaging system includes a transmitting module transmitting a transmitted optical signal that illuminates a target space and contains a transmitted pulse that is modulated with a first pseudo-noise (PN) code. The imaging system includes a receiving module that receives a reflected optical signal from an object. The reflected signal is processed by an optical array that detects a detected signal from the reflected optical signal, where the detected signal contains a plurality of pixels spanning a target space. When the determined PN code corresponds to the selected PN code, image information and the positional information is presented for the object. When different positional information is obtained for different pixels in the image, the imaging system may determine that different objects appear in the received image.

31 Claims, 11 Drawing Sheets

FULL-FIELD LIGHT DETECTION AND RANGING IMAGING SYSTEM

FIELD OF THE INVENTION

The present invention relates to an imaging system that includes light detection and ranging (LIDAR) data for a pixel of imaging information.

BACKGROUND OF THE INVENTION

The United States military has designated mobile robotics and autonomous vehicle systems having a high priority for future combat and warfare, and consequently there is a strong demand for more intelligent and reliable vision sensor subsystems in today's tactical vehicles. Future combat vehicles will be highly dependent upon a wide variety of robust sensor technologies both inside the vehicle (monitoring occupant presence and position) as well as external to the vehicle (monitoring vehicle orientation, relative closing velocities, and potential obstacles).

Prior art multi-camera vision systems typically used in military applications incorporate high resolution, silicon-based day-cameras, as well as infrared (EOIR) focal plane arrays. The far-infrared (FIR and LWIR) cameras typically operate in the 6 to 14 micrometer range and are usually based upon micro-bolometer devices, while the near infrared systems (NIR and SWIR) are designed for ~850 nm to 1600 nm and use Si-photodiodes or narrow-bandgap materials. For most applications, time-critical, image computing is crucial. Moreover, imaging systems have applications that span both military and commercial applications. Studies have shown, for example, that with conventional automobiles, an extra 0.5 second of pre-collision warning time, nearly 60% of all highway accidents could be avoided altogether. For military combat vehicles, the time-critical requirements are even more demanding.

Current optical light detection and ranging (LIDAR) cameras are typically deployed along with conventional millimeter wave (mmW)-based RADAR throughout the future combat system (FCS) fleet, including applications for internal inspection, weapons targeting, boresighting, indirect driving, obstacle/enemy detection, and autonomous and semi-autonomous navigation. LIDAR cameras typically have a separate LIDAR detector since the imaging arrays have integration times that are too long for LIDAR data capture.

LIDAR systems have proven to be relatively reliable even when incorporated in low cost systems. Multifunctional LIDAR systems are capable of measuring not only distance but can be pulsed and beam multiplexed to provide triangulation and angular information about potential road obstacles and targets and about environmental and situational awareness. LIDAR imaging systems offer a number of advantages over other conventional technologies. These advantages include:

Good target discrimination and range resolution

Capability of scanning both azimuthally and vertically using electronic monopulsing techniques Capability of imaging both near and far range objects using telescopic optics assuming a clear optical path Fast update and sampling rate (100 MHz is typical and is limited by the carrier frequency of 25 THz (3 psec/m pulse transit time)

Good temperature stability over a relatively wide range (−50° to 80° C.)

The technology is highly developed and commercially expanding in optical communications, leading to both cost and technology windfalls.

Consequently, there is a real market need to provide LIDAR imaging systems that provide imaging and associated positional information (e.g., velocity and/or range of another vehicle) in an expeditious and efficient manner.

BRIEF SUMMARY OF THE INVENTION

An aspect of the invention provides an imaging system for determining positional information from a reflected optical signal for an object on a per pixel basis. Positional information may include ranging and/or velocity estimates of the object.

With another aspect of the invention, an imaging system includes a transmitting module that transmits an optical signal. The transmitted optical signal illuminates a target space (i.e., Field of View, or FOV) and contains a transmitted pulse that is modulated with a first pseudo-noise (PN) code.

With another aspect of the invention, an imaging system includes a receiving module that receives a reflected optical signal from an object. The reflected signal is processed by an optical array that detects a signal from the reflected optical signal, where the detected signal contains a plurality of pixels spanning a target space. A processing module determines pulse characteristics and subsequently obtains positional information on a per pixel basis. When the determined PN code corresponds to the selected PN code, image information and the positional information is presented for the object.

With another aspect of the invention, when different positional information is obtained for different pixels in the image, the imaging system determines that different objects appear in the image. The imaging system may distinguish the different objects in a display presented to a user.

With another aspect of the invention, an imaging system correlates a transmitted pulse and a received pulse to obtain a time delay and pulse width of the received pulse. The reflected optical signal is subsequently processed in accordance with the time delay and the pulse width.

With another aspect of the invention, an imaging system supports spread spectrum techniques, including direct sequence spread spectrum (DSSS), frequency hopping spread spectrum, and time hopping spread spectrum.

Not all of the above aspects are necessarily included in every embodiment of the invention.

BRIEF DESCRIPTION OF THE DRAWINGS

A more complete understanding of the present invention and the advantages thereof may be acquired by referring to the following description in consideration of the accompanying drawings, in which like reference numbers indicate like features and wherein.

DETAILED DESCRIPTION OF THE INVENTION

In the following description of the various embodiments, reference is made to the accompanying drawings which form a part hereof, and in which is shown by way of illustration various embodiments in which the invention may be practiced. It is to be understood that other embodiments may be utilized and structural and functional modifications may be made without departing from the scope of the present invention.

Figure 1:
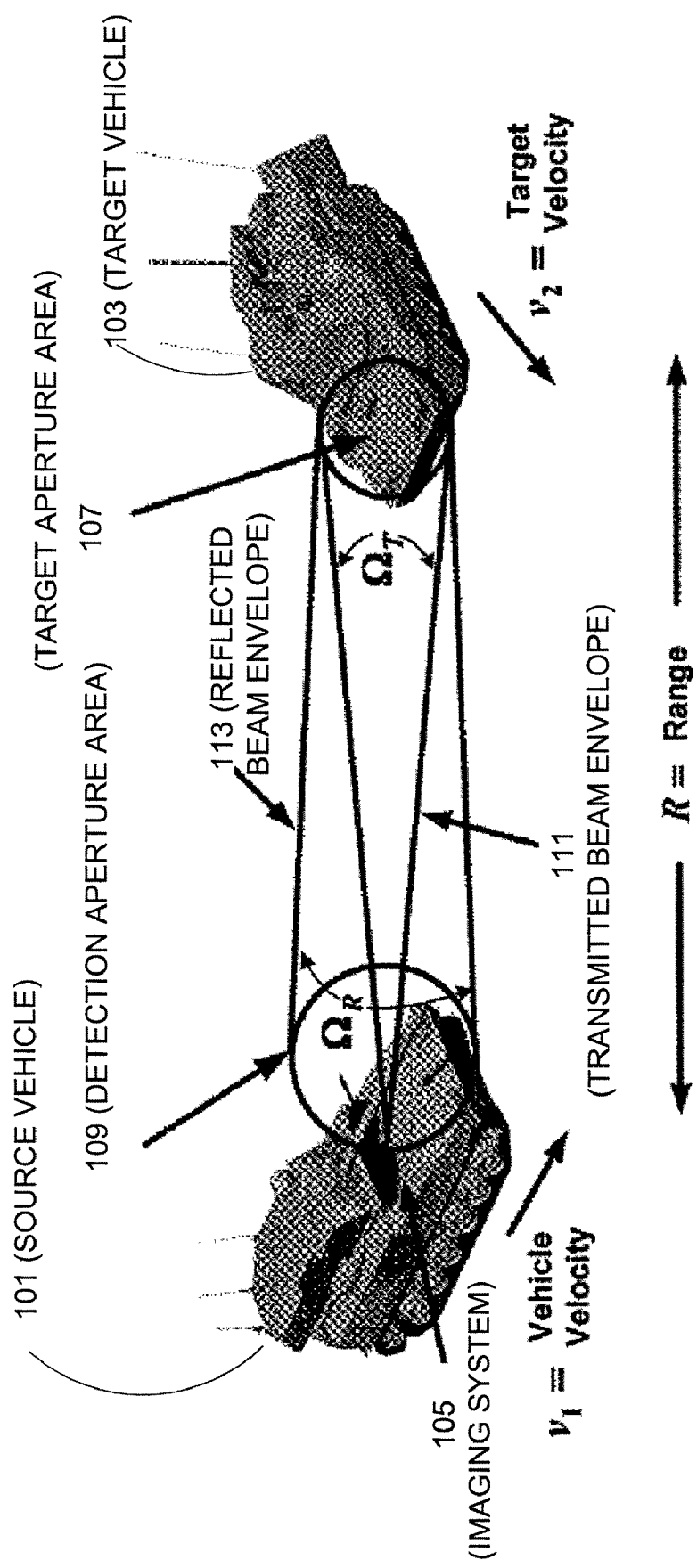
FIG. 1 shows a geometry of an imaging system in accordance with an embodiment of the invention.

FIG. 1 shows an exemplary geometry of an imaging system in accordance with an embodiment of the invention. Source vehicle 101 is equipped with imaging system 105 for determining imaging and positional data for target vehicle 103. (Positional information may indicate a current position and/or projected position of target vehicle 103. For example, positional information may include a relative velocity and a range of target vehicle 103 with respect to source vehicle 101.) The geometry as shown in FIG. 1 is based on isotropic scattering and has essentially the same geometry when viewed from above. The optical radar equation relating the reflected power for each pixel is given by:

$$P_R = \left(P_T \frac{\sigma}{\Omega_T R^2} e^{-\alpha R}\right)\left(\frac{A_R}{4\pi R^2} e^{-\alpha R}\right) = P_T \frac{\sigma A_T A_R}{4\pi \lambda^2 R^4} e^{-2\alpha R} \quad \text{EQ. 1A}$$

for an unresolved object (i.e., an object which is on the same order or smaller than the diffraction beam pattern), where $\sigma$ is the target cross-section, $A_T$ corresponds to target aperture area 107, and $A_R$ corresponds to receive aperture area 109. For "large" objects (often referred as a resolved object):

$$P_R = (P_T e^{-\alpha R})\left(\frac{\rho A_R}{\pi R^2} e^{-\alpha R}\right) = P_T \frac{\rho A_R}{4\pi R^2} e^{-2\alpha R} \quad \text{EQ. 1B}$$

As modeled in EQ. 1B, objects of interest for vehicle applications are relatively large under unity magnification and are thus characterized by their reflectivity more than their "radar" cross section. One notes that the above equations are formulated as optical power quantities, and in some embodiments of an imaging system the optical intensity may be expressed as $$I_R = \frac{P_R}{\text{Area}}.$$

Referring to FIG. 1, aperture areas 107 and 109 correspond to $\Omega_T$ and $\Omega_R$, respectively. The circular areas of intersection with the target and receiver are $A_T$ and $A_R$. $A_T$ and $A_R$ are actually collocated at the source/receiver. The nomenclature is unfortunate. (A pixel is a picture element corresponding to the smallest unit of area of a video image that can be varied in intensity.) $\Omega_T$ corresponds to the beamwidth of transmitted beam 111 and is approximately equal to $\lambda^2/A_T$, where $\lambda$ is the wavelength of the illuminating optical beam. $\Omega_R$ corresponds to the beamwidth of reflected beam 113. $P_T$ is the original transmitted power, R is the range or distance on a direct line segment connecting the two vehicles 101 and 103, and $\alpha$ is the atmospheric attenuation coefficient.

From EQ. 1A, one observes that the transmitted power is scattered, attenuated and diffracted isotropically and varies as $1/R^4$ (for the unresolved case) but varies as $1/R^2$ for the resolved case (corresponding to EQ. 1 B). As a result, imaging and telescoping optics are typically utilized for long distances in order to keep beam divergence and optical losses as low as possible in order to provide adequate optical power to an imaging system. As a result the target and detection apertures 107 and 109 are of the same order.

While FIG. 1 illustrates a military application, embodiments of the invention support commercial applications, including automobile collision avoidance, production automation, and autonomous navigation. Moreover, application may involve military vehicles, automobiles, ships, and aircraft.

The closing velocity, or relative velocity, may be defined as $v_R = v_{source} - v_{target}$. In the above definition, one refers to light (optical) signals and quantities which occur at normal incidence, with the range effects and Doppler modulation occurring along the radial line connecting the imaged scene (2-D plane normal to the line of view) and the camera. To obtain vector motion, two such cameras would be necessary in order to determine for example the vector closing velocity or a distance parameter at an angle to image plane. Also, the exemplary geometry shown in FIG. 1 indicates a field of view (FOV) and Target Area which is centered on the front portion of a battle space object (BSO) or target. In many applications, multiple BSOs, obstacles, or other items of interest may be imaged, where each point in the object space would have a different range parameter, and a distinct relative velocity parameter or closing velocity (positive if moving towards, negative if moving away) relative to the camera.

Figure 2:
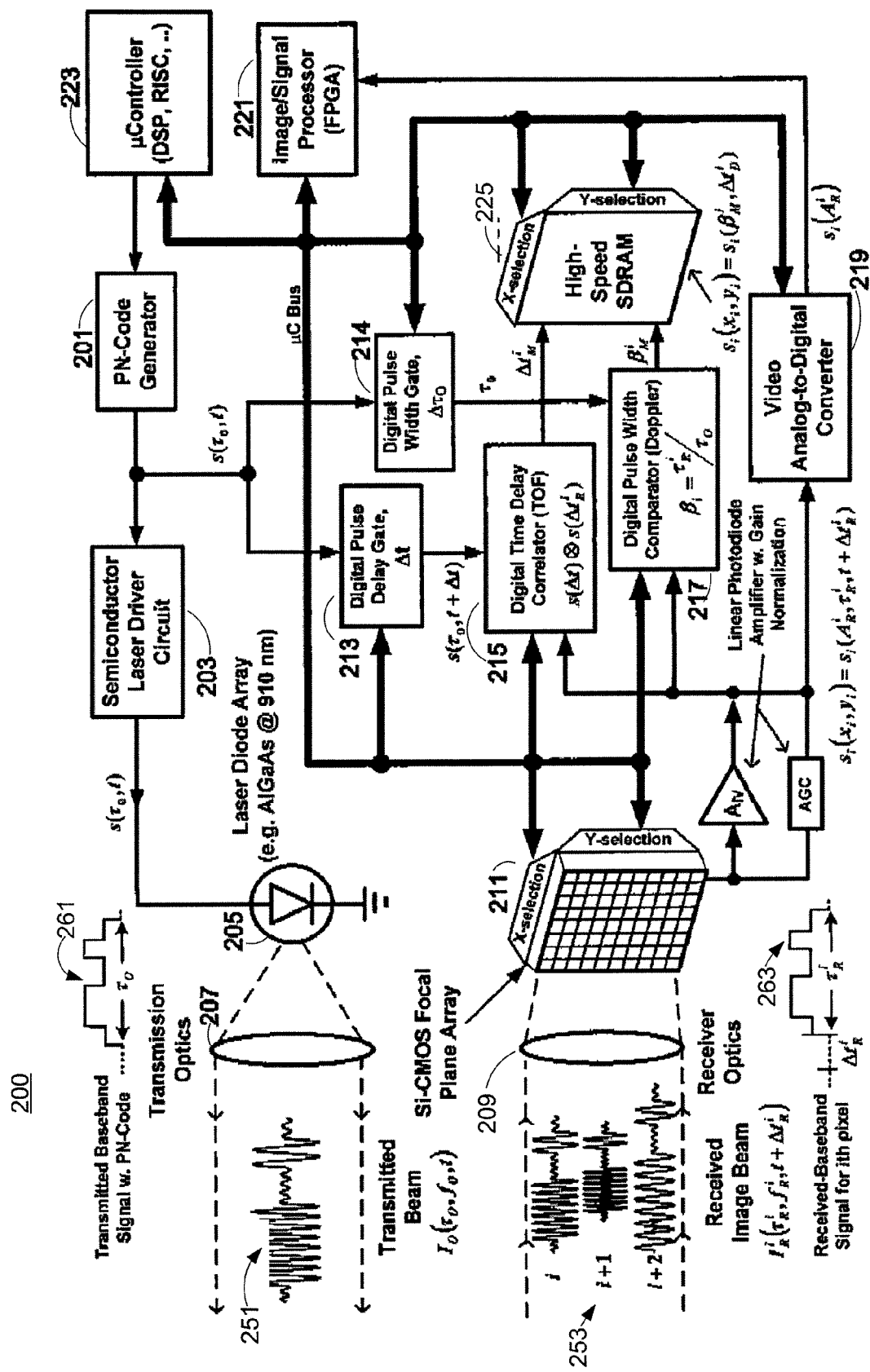
FIG. 2 shows a first architecture of an imaging system in accordance with an embodiment of the invention.

FIG. 2 shows a first architecture of imaging system 200 in accordance with an embodiment of the invention. Imaging system 200 utilizes a common lens or set of optics for transmitting and receiving (sensing) as represented by transmitted lens 207 and receiver lens 209.

Figure 6:
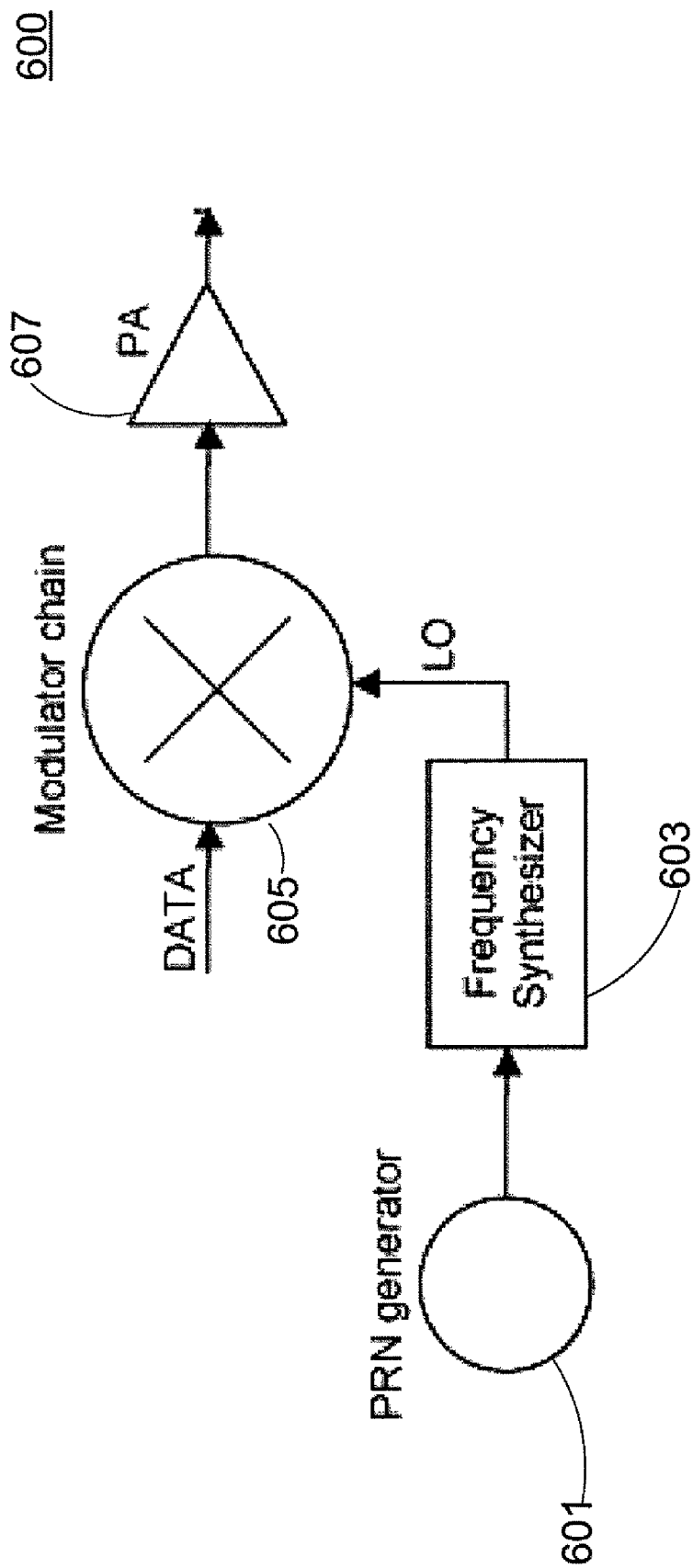
FIG. 6 shows a generator of a frequency-hopping spread spectrum (FHSS) signal in accordance with an embodiment of the invention.

Imaging system 200 generates transmitted optical signal 251 from baseband signal 261 through laser driver circuit 203 and laser diode array 205, which is modulated by PN-code generator 201. With an embodiment of the invention, the transmitted pulse is modulated with a selected pseudo-noise (PN) code (as shown in FIG. 6) as determined by controller 223. (With an exemplary embodiment, a single pulse is transmitted upon a baseband signal with a modulated PN code. The pulse is characterized by an active illumination that spans the target space in terms of covering the field of view (FOV).) The electrical baseband signal can be written mathematically as $s(\tau_0, t)$, and the laser-produced optical signal with intensity $I_0(\tau_0, f_0, t)$. Embodiments of the invention support signals in the optical spectrum, which corresponds to an electromagnetic spectrum with the wavelengths extending from an ultraviolet region at approximately 1 nm to an infra-red region at approximately 1 mm. While the optical spectrum encompasses an electromagnetic spectrum visible to the normal human eye (approximately 400 nm to 700 nm), the optical spectrum supported by the exemplary embodiment shown in FIG. 2 may encompass wavelengths between the shortest wavelengths of the radio region and the longest X-ray region.

Figure 9:
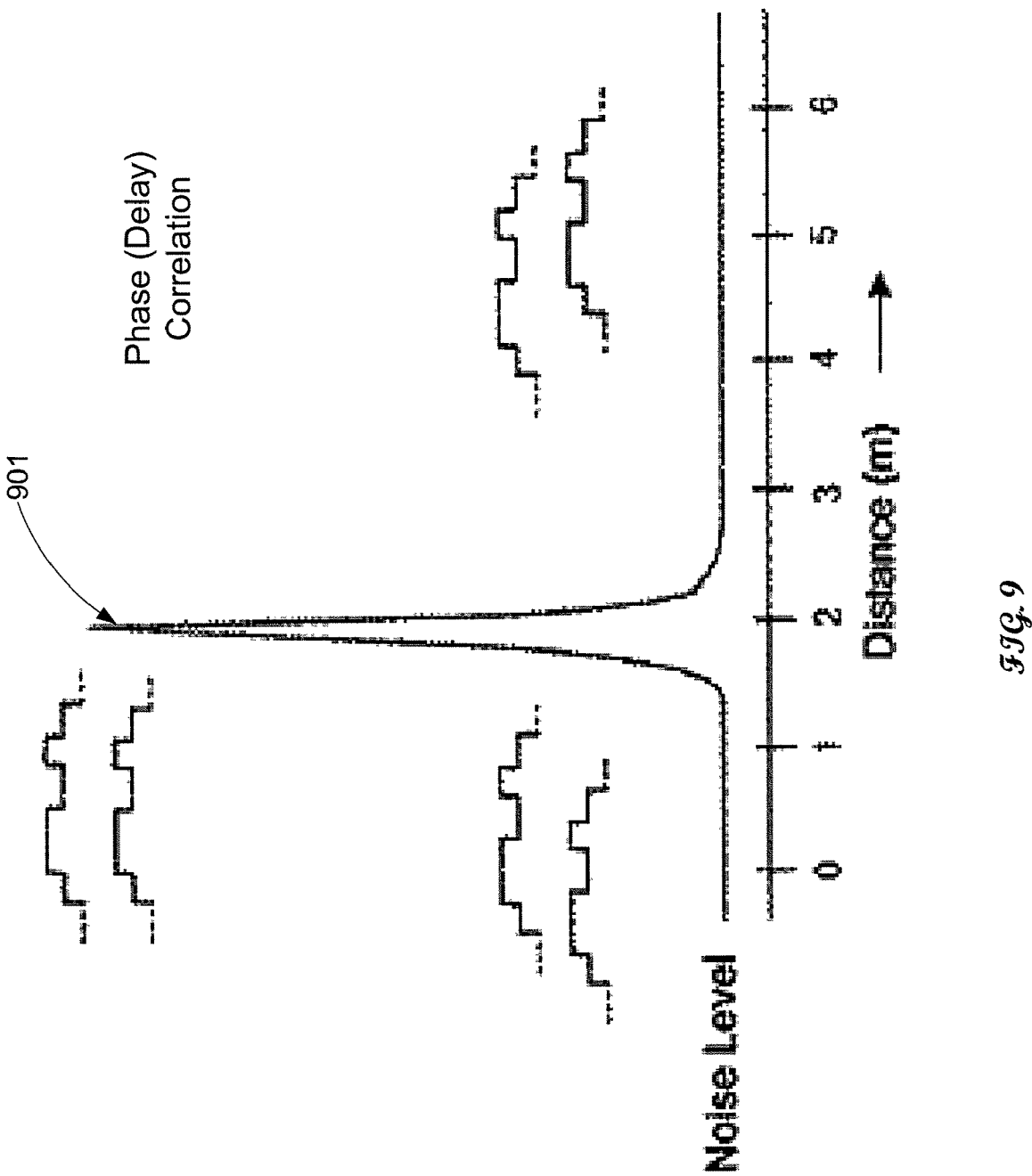
FIG. 9 shows an exemplary correlation result for a received DSSS signal in accordance with an embodiment of the invention.

With some embodiments of the invention, each PN code is orthogonal to the other PN codes (which are contained in the set of orthogonal PN codes), where $c_n$ is the $n^{th}$ PN code and $\int_{pulse\ duration} c_n c_m dt = 0$ when, $n \neq m$. As will be discussed, imaging system 200 pulse duration performs an autocorrelation of the received optical signal to determine whether the received signal is modulated with the selected PN code. Exemplary PN codes may be obtained from Walsh functions having a desired degree of robustness from interference generated by other sources. Embodiments of the invention may also utilize semi-orthogonal codes, in which the corresponding peak autocorrelation value (e.g., as shown in FIG. 9) is sufficiently large to adequately discern a desired received optical signal. The selected PN code distinguishes transmitted optical signal 251 from other transmitted optical signals that may be generated by other imaging systems. (PN codes may be generated by different methods so that the codes are sufficiently orthogonal to separate the desired signal from another signal having a different PN code. A Walsh code is one approach for obtaining a PN code.) Consequently, imaging system 200 is able to distinguish corresponding reflected optical signal 253 from other reflected optical signals.

While FIG. 1 illustrates a scenario that includes a single object in the received image (i.e., target vehicle 103), embodiments of the invention support scenarios in which there are a plurality of objects (e.g., military vehicles or automobiles) in the image. For example, if positional information associated with different objects is sufficiently different (e.g., velocity and/or range), imaging system 200 can distinguish between the different objects in a display presented to a user.

Some embodiments of the invention process a received full-field, LIDAR image from reflected optical signal 253 through receiver lens 209 with video-based camera sensor 211, which comprises a (complementary metal-oxide semiconductor) CMOS, direct-addressable array and circumvents the need to optically heterodyne the reflected optical or infrared carrier with an optical reference signal in order to obtain the Doppler frequency shift or time-of-flight (TOF) information. However, embodiments of the invention support other types of imaging arrays, including a charge-coupled device (CCD) array.

With embodiments of the invention, camera sensor 211 typically comprises a basic focal plane array (FPA). Camera sensor 211 may provide the same video output as a standard Si black and white or color camera. Typically, the array comprises a CMOS FPA, since one typically desires to rapidly scan each pixel value into both time delay correlator 215 and pulse width comparator 217 as well as into the video ADC 219. System 200 typically scans an entire pulsed, PN sequence, with intensity information However, the added circuitry that one often finds in an off-the-shelf, packaged camera, is typically included as part of sensor 211. A typical camera typically includes the ADC, and usually a CODEC for modulating the video signal as a particular data transmission standard (e.g. 10-GbE, or DVI) with a particular compression format, (e.g., H.264/MPEG-4/JVT, or JPEG-2000, MPEG-7, etc.). A typical camera may also format the video signal as a Bayer pattern or as an RGB format for color images. However, with the operational characteristics of the exemplary embodiment sown in FIG. 2, the active illumination is monochromatic (spatially and temporally coherent). Color imagery may be supported by imaging system 200, but may not be gennane to the functionality of some embodiments, in which the operation encompasses only monochromatic imagery. Sensor 211 may include only a focal plane array with addressing circuitry.

Imaging system 200 supports measurements of pixel-specific range and radial closing velocity (i.e., the velocity of target vehicle 103 with respect to source vehicle 101) over the full image field and supports applications requiring full-field distance and velocity information, such as a positioned military vehicle in order to complement a standard visible camera or optical image sensor, and greatly enhancing the performance of the latter. Imaging system 200 determines positional LIDAR data (e.g., velocity and/or ranging estimates) for each pixel of the overall image. The positional information may be subsequently added to image information on a per pixel basis.

Imaging system 200 may be applied to indirect and semi-autonomous driving of tactical vehicles, obstacle detection, reconnaissance and surveillance, targeting for weapon systems, and adaptive, fully autonomous navigation of vehicles such as an autonomous robotic vehicle. In addition, imaging system 200 may be employed for standard ground or air vehicles such as automobiles and trucks to provide pre-crash detection, cruise control and parking assist among other functionalities. Another area of applicability encompasses machine vision for industrial automation in production and manufacturing environments, where semi-stationary robots are becoming more and more prevalent.

Each pixel of camera sensor 211 captures the relative velocity and range of the corresponding image points, instantaneously, at any given time. A pulsed, active-illumination is utilized and is modulated with a pseudo-noise (PN) coding of the pulse. The active illumination may be typically generated from a laser diode or other suitable, coherent light source, e.g., a vertical cavity surface emitting laser (VCSEL) array, typically operating in the near infrared at ~800 to 1500 nm. The PN coding of the pulse provides a wideband modulated optical carrier that may allow the imaging system to discriminate from other active imaging system or complementary active LIDAR detectors and may also reduce reflections or light signals from other sources, lowering noise and interference. The exemplary embodiment shown in FIG. 2 deploys signal correlation techniques rather than optical heterodyning to determine both the pulse width and pulse phase or pulse delay. However, as will be discussed with FIG. 4, embodiments of the invention may utilize a heterodyned image as well.

As previously discussed, transmitted optical signal 251 comprises a transmitted pulse that spans a target space (both the horizontal and vertical fields of view, denoted as HFOV and VFOV, respectively). Imaging system 200 processes the reflected optical signal 253 for each pixel of camera sensor 211 to obtain received baseband signal 263.

Reflected optical signal 253 comprises an ensemble of reflected optical components, each reflected component being reflected by a portion of an illuminated object and corresponding to a pixel. Ensemble components are spatially separated in the x and y directions so that an ensemble component (corresponding to a pixel) is selected through x-selection and y-selection circuitry of camera sensor 211. As shown in FIG. 2, the $i^{th}$ reflected component is associated with the $i^{th}$ pixel.

Typically, imaging system 200 derives an analog signal for each pixel (e.g., 10 to 24-bit) with intensity information (and perhaps embedded color which is later converted to RGB information). The analog (quasi-digital) signal contains the original modulated PN code, which is used with correlator 215 and comparator 217. The correlation outputs are read into a high-speed electronic memory device 225 (e.g., an SDRAM, or other suitable memory device such as an FPGA, PLD or Flash-RAM). However, the generated digital delay and digital pulse width determine the time delay and pulse width.

High-speed electronic memory device 225 stores pulse characteristics for each pixel as determined by correlator 215 and comparator 217. Pulse characteristics may include the pulse delay and the pulse width of the $i^{th}$ pulse. Pulse characteristics may be different for different pixels. For example, pulse widths may be different if an optical signal is reflected by different objects moving at different velocities. Also, the pulse delay of a pulse varies with the range from system 200. Signal processor 221 subsequently utilizes the pulse characteristics to associate video information (obtained through video analog-to-digital converter 219) with each pixel.

With the following analysis one may assume that, in general, not all targets are resolvable, so that some images will not completely fill the field of receiver lens 209. Time-of-flight (TOF) techniques yield:

$$R = \frac{c \Delta t_R}{2} \quad \text{EQ. 2}$$

where the range distance R is the straight-line distance between the transmitter (source vehicle 101) and the target (target vehicle 103), $\Delta t_R$ equals the round trip delay time for a pulse to return to the transceiver, and c equals the speed of light under atmospheric conditions. In order to obtain object-to-object spatial resolution within the round trip delay time, one observes that in order to resolve the reflections of coherent light from two different objects, the reflections must be separated in time by an amount similar to the pulse duration;

$$\delta R = \frac{c \tau_P}{2} \quad \text{EQ. 3}$$

which gives the resolution $\delta R$ for a single pixel LIDAR measurement, where $\tau_P$ is the pulse width. This is similar to the Rayleigh Criterion in optics where $$\delta R_{spherical} = 1.22 \frac{\lambda f}{D},$$

D is the effective diameter of the optics/lens or aperture stops within the system, f is the focal length of these optics, $\lambda$ is the optical carrier wavelength, and the resolution is given for two circular objects (as opposed to rectangular objects). One should note that the calculation by these two methods should, ostensibly, yield the same result. The sampling rate typically equals $1/\tau_P$. For distances relevant to the tactical vehicle range, such as obstacle detection and targeting, accuracies of 0.1 m or less may be desirable. This degree of accuracy gives a maximum pulse width of approximately 3 nsec. One may make a distinction here between resolution and precision. The resolution measures the ability of a LIDAR or RADAR to resolve or distinguish between separate targets that are close together in the measurement dimension. The precision gives the fluctuation or uncertainty in the measured value of a single target's position in the range, angle or velocity dimension.

The actual range error of each pixel, $\epsilon_{RANGE}$, assuming that the pulse width is simply related to the bandwidth as $B=1/\tau_{PULSE}$, is given by:

$$\varepsilon_{RANGE} = \frac{c}{2B\sqrt{2 \cdot SNR}} \quad \text{EQ. 4}$$

where SNR equals the signal-to-noise ratio for the LIDAR camera. One can determine the closing velocity resolution $\epsilon_{v_R}$ for a relative or closing velocity, as defined previously, by:

$$v_R = v_{SOURCE} - v_{TARGET} \quad \text{EQ. 5}$$

Figure 7:
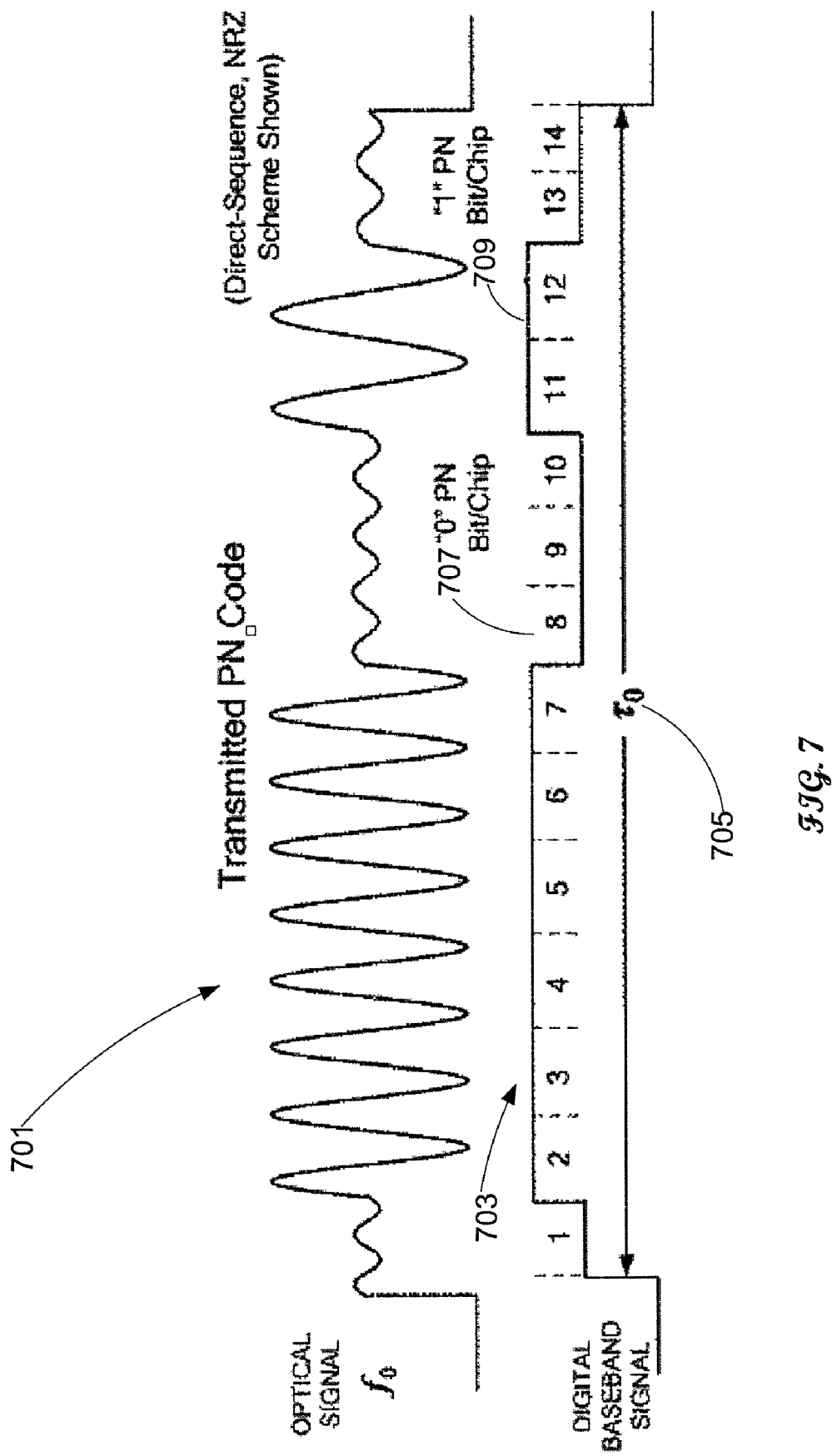
FIG. 7 shows an exemplary transmitted signal in accordance with an embodiment of the invention.

If the source (mission vehicle 101) and target (target vehicle 103) are moving toward each other, the reflected frequency will be increased (corresponding to a positive Doppler shift), whereas the opposite will occur if vehicles 101 and 103 are receding from each other (corresponding to a negative Doppler shift). The former situation is depicted in FIGS. 6 and 7. The integration time, $t_{INT}$ needed to resolve two Doppler frequencies separated by $\Delta f_D$ is approximately given by $t_{INT} = 1/\Delta f_D$. The Doppler shift is calculated from:

$$\Delta f_D = \frac{2 v_R}{\lambda} = f_0 \left( \frac{2 v_R}{c} \right) \quad \text{EQ. 6}$$

where $f_R = f_0 \pm \Delta f_D = f_0 (1 \pm 2 v_R / c)$. The plus and minus sign are used to indicate if the source (camera) and target objects are approaching or receding from each other, respectively. Consequently, the Doppler shift resolution is given by:

$$\delta f_D = \frac{c}{2 t_{INT} \sqrt{2 \cdot SNR}} \quad \text{EQ. 7}$$

from which one can determine the error in the measured closing velocity as:

$$\varepsilon_{v_R} = \frac{\lambda}{2 t_{INT} \sqrt{2 \cdot SNR}} \quad \text{EQ. 8}$$

Using EQs. 2-8, calculations suggest that range/velocity measurement accuracy and resolution can be significantly increased as compared to current schemes that utilize kinematics-based algorithms to determine range rate or closing velocity. Kinematics-based algorithms are typically implemented as software schemes that perform image segmentation, feature extraction, edge detection and image transformations. These techniques may require an extensive amount of computer memory, computational time for targeting assessment, and controller processing effort. Therefore, a significant decrease in the image processing hardware and computing software can be achieved, thus reducing overall system latency, decreasing the software overhead, and freeing up valuable processor resources thus enabling the full-field imaging. Consequently, the "raw" distance, angle and image velocity parameters can be provided to the image processor 221 without the need for the above statistical algorithms. In addition, continuous, stationary roadway and field obstacles or enemy vehicles, which presently cannot be targeted unambiguously by conventional optical or mmW RADAR system, can be more effectively identified with the proposed method.

Imaging system 200 allows a mapping of the dynamic LIDAR variables to a standard acquired image, by employing affine transformations and cosine matrices to correlate the LIDAR data with the standard image data, as well as utilizing extended Kalman filters for fusion with complementary image data such as mmW RADAR. Affine transformations are typically used to "boresight" or align the camera with other cameras or sensors on the vehicle. (An affine transform is a transformation that preserves collinearity between points, i.e., three points that lie on a line continue to be collinear after the transformation, and ratios of distances along a line.) In a general sense, any measurement may be translated to any other point on the vehicle (e.g., in alignment with a RADAR sensor, a weapon, or with the occupant of a passenger vehicle) by utilizing a cosine matrix corresponding to a process of applying an affine transformation. Kalman Filters are generally employed to do this for functions that are linear in 3-space. For non-linear functions of space, the extended Kalman filter is used.

Figure 8:
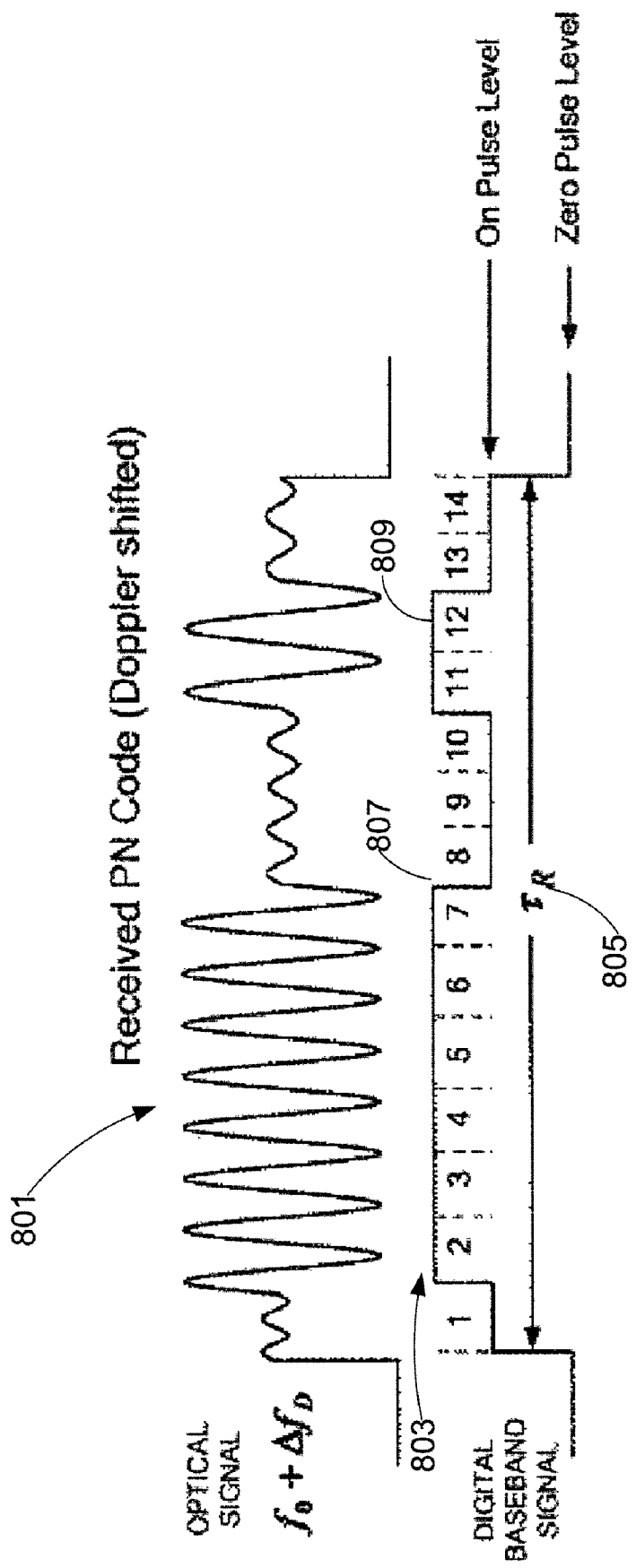
FIG. 8 shows an exemplary received signal in accordance with an embodiment of the invention.

As discussed above, in addition to object detection and invalid image detection (as will be discussed with FIG. 3), system 200 may determine positional information such as target range, angle and velocity. A conventional video camera typically produces sequential frames of pixels, each of which represents the time-dependent intensity of the pixel correlating to the corresponding optical field of view. Color cameras typically employ separate photo-detectors and bayer pattern optical filters on a per pixel basis, where each optical filter correlates to one of the three primary color sets. With typical conventional CMOS or CCD cameras, the pixel intensity may not be interpreted by an autonomous system unless the distance to the image is known a priori. With imaging system 200 range and velocity estimates are measured as described previously. However, with embodiments of the invention these parameters are physically encoded onto the optical field and become an artifact (e.g., corresponding to signal characteristics of received optical signal 801 as shown in FIG. 8) of the time-dependent intensity of each pixel in the CMOS focal plane array. As will be discussed, positional information may be obtained from the artifact by determining the Doppler frequency and pulse characteristics of received optical signal 801 as shown in FIG. 8. Consequently, frames of highly resolved scene data, which are readily available to the image processing subsystem, are provided. The need for these measurements to be extracted from several frames of image data using feature extraction, edge detection, etc. may be circumvented. Instead of "seeing" just image points in 3-space, however, the camera is actually viewing the LIDAR data encoded into each pixel on top of the imaged intensity data. While infrared LIDAR systems are commonly used in conjunction with visible and infrared cameras in accordance with the prior art, embodiments of the invention simultaneously incorporate the direct, pixel-level LIDAR data with the raw measurements from the artifacts of received optical signal 801 (as will be discussed). By simply disabling the active PN modulation, the camera can produce a conventional "night vision" image by simply bypassing the correlation circuitry and routing the pixel data to an appropriate display. Also, the un-illuminated scene will produce conventional day-camera images. One may further toggle between these states allowing data from each mode to be collected.

As an example of an application, consider a battlefield leader-follower situation for tactical vehicles which utilizes image data as the chaining modality. In order for the trailing vehicle to detect whether the leading vehicle is making a right turn, its prior art imaging system performs successive frame captures of the scene (or image) in front of it and uses feature extraction and statistical processing of the series of frames to determine whether the vectors from its own reference point to the various image points of the scene in front of it are changing and how they are changing successively. With imaging system 200, execution complexity may be significantly reduced to accessing the stored pixel data, which already contains each pixel range and velocity data. Near-range resolution may be obtained using pseudo-noise (PN) and correlation techniques, applied on a pixel by pixel basis. For suitable chip modulation, e.g., 1024 chips per pulse, a direct sequence PN scheme may achieve practically full discrimination against background noise.

Referring to FIG. 2, PN code generator 201 produces a modulation signal $s(\tau_0, f_0, t)$ sometimes referred to as the intermediate frequency (i.f.) signal. The modulation signal is applied to laser diode driver circuit 203 and consequently the transmitted illumination 251 of the target field through laser diode array 205 and transmission lens 207. Laser diode array 205 may comprise diodes that are of a AlGaAs/GaAs, InGaAs/GaAs, or InP type emitting in the 850 nm to 1550 nm optical bands for example. Reflected optical signal 253 returns after the optical signal travels a length of 2R and has a corresponding delay, $\Delta t_R^i$, frequency, $f_R = f_0 \pm \Delta f_D$, and pulse width, $\tau_R = \tau_0 \pm \tau_D$, indicated by $s(\tau_0 \pm \tau_D, f_0 \pm \Delta f_D, t + \Delta t_R)$. Each pixel of CMOS focal plane array 211 contains the optical field intensity, $I_R$, modulated by the pulse phase and frequency shifts. Reflected optical signal 253 is spatially structured, and arrives at receiver optics 209 as a collection or ensemble of reflected beams, each with a different range, $R_i$, and carrier Doppler shift, $\Delta f_R^i$. The beams are partitioned by projecting the pixellation $(x_i, y_i)$ pattern of the camera FPA out onto the object field. Thus the $i^{th}$ pixel detects a pulse with a PN sequence and intensity expressed as $I_R^i(\tau_R^i, f_R^i, t + \Delta t_R^i)$. The $i^{th}$ ensemble component has a delay, $\Delta t_R^i$, and a Doppler shift, $\Delta f_R^i$, and subsequent pulse width, $\tau_R^i$. Each pixel is enabled to allow the PN sequence to be converted to an electrical signal by the photodiode amplifier and fed into the Digital Delay Correlator 215, and the Digital Pulse Width Comparator 217. The electrical signal has an automatic gain control to allow the intensity information to be encoded into an appropriate voltage or current with amplitude given generically as, $A_R^i$. A mathematical representation of this ith electrical signal can be written, $$s_i(x_i, y_i) = s_i(A_R^i, \tau_R^i, t + \Delta t_R^i) \qquad \text{EQ.9}$$

This electrical signal is what is actually presented to the Digital Time Correlator 215, the Digital Pulse Comparator 217, as well as the Video ADC (analog-to-digital converter) 219.

With embodiments of the invention, image array 211 detects illumination in the 850 nm to 1500 nm range (near infrared or SWIR) using Si-CMOS photo detection. Image array 211 delivers image data, sometimes at data rates of greater than 5-Gbits/sec depending upon the pixel resolution of the focal plane array camera (for reference 2048×2048~4 Mpixels). Image array 211 may utilize sophisticated, information-rich image processing and control systems, in order to provide accurate image and target assessments to deliver the high mobility and lethality required for future combat systems. Image array 211 comprises a focal plane array which may be obtained by modifying an off-the-shelf camera or may be commonly manufactured. Field programmable gate array (FPGA) 221 is typically deployed in imaging system 200 in order to provide high-bandwidth, parallel data processing. In addition, sensor system data latency and high image quality and dynamic camera response (>100 dB) are typically desired. However, prior art LIDAR image cameras may not generate raw, pixel data for relative velocity and range. Three dimensional cameras typically incorporate the capability of extracting the image depth of focus but not ranging data. Flash cameras yield time-of-flight information using a single pulse, but are not enabled for measuring image velocity. Instead, flash cameras typically use a standard CCD or CMOS focal-plane array, coupled with a separate LIDAR subsystem (typically, a single-beam diode laser and a single Si-photodiode). The inclusion of LIDAR variable extraction may allow substantial relief to the on-board image processing and computing resources.

Components of imaging system 200 may be associated with different functional aspects including a transmitting module, a receiving module, and an optical array. As shown in FIG. 2, components 201-207, 213 and associated logical portions of controller 223 are mapped to the transmitting module. Components 209, 215-221, and associated logical portions of controller 223 are mapped to the receiving module. Camera sensor 211 is mapped to the optical array.

Imaging data is then selected by the CMOS de-multiplexing circuitry (corresponding to X-selection and Y-selection as shown in FIG. 2) of image array 211, amplified by a high impedance photodiode amplifier (normalized by an AGC or automatic gain control), and subsequently fed in parallel to the pulse-width correlator 215 and time delay correlator 217. Pulse-width correlator 215 and time delay correlator 217 obtain a delayed version of $s(\tau_0, f_0, I_0, t)$, as provided by modules 213 and 214, respectively, which is used to perform a "sliding peak" correlation technique as shown in FIG. 8 as will be discussed. The results are digitized by a high-speed ADC (analog-to-digital converter) 219 and sent to image processor 221 and processor 223 to generate final pixel data for camera system 200. With embodiments of the invention, ADC 219 measures the intensity level of the pixel data (and may be extended for color cameras).

While positional information is available on a per pixel basis, imaging system 200 may combine positional information (e.g., range estimates and velocity estimates) from a plurality of pixels to obtain estimates with greater certainty. For example, the range estimates and the velocity estimates over several pixels in an image may be averaged. If the difference between estimates of different pixels is sufficiently large (e.g., greater than a predetermined percentage of an averaged estimate), imaging system 200 may determine that more than one object appears in the image, where the different objects may have different ranges and different velocities. (Alternatively, imaging system 200 may determine an inconsistency in the determined positional information and consequently indicate the inconsistency.) If imaging system 200 determines that there are a plurality of objects (e.g., multiple target vehicles) in the reflected image, imaging system 200 may distinguish between different target vehicles in the display presented to a user. Process 300, as shown in FIG. 3, provides an exemplary embodiment for distinguishing between different target vehicles.

Figure 3:
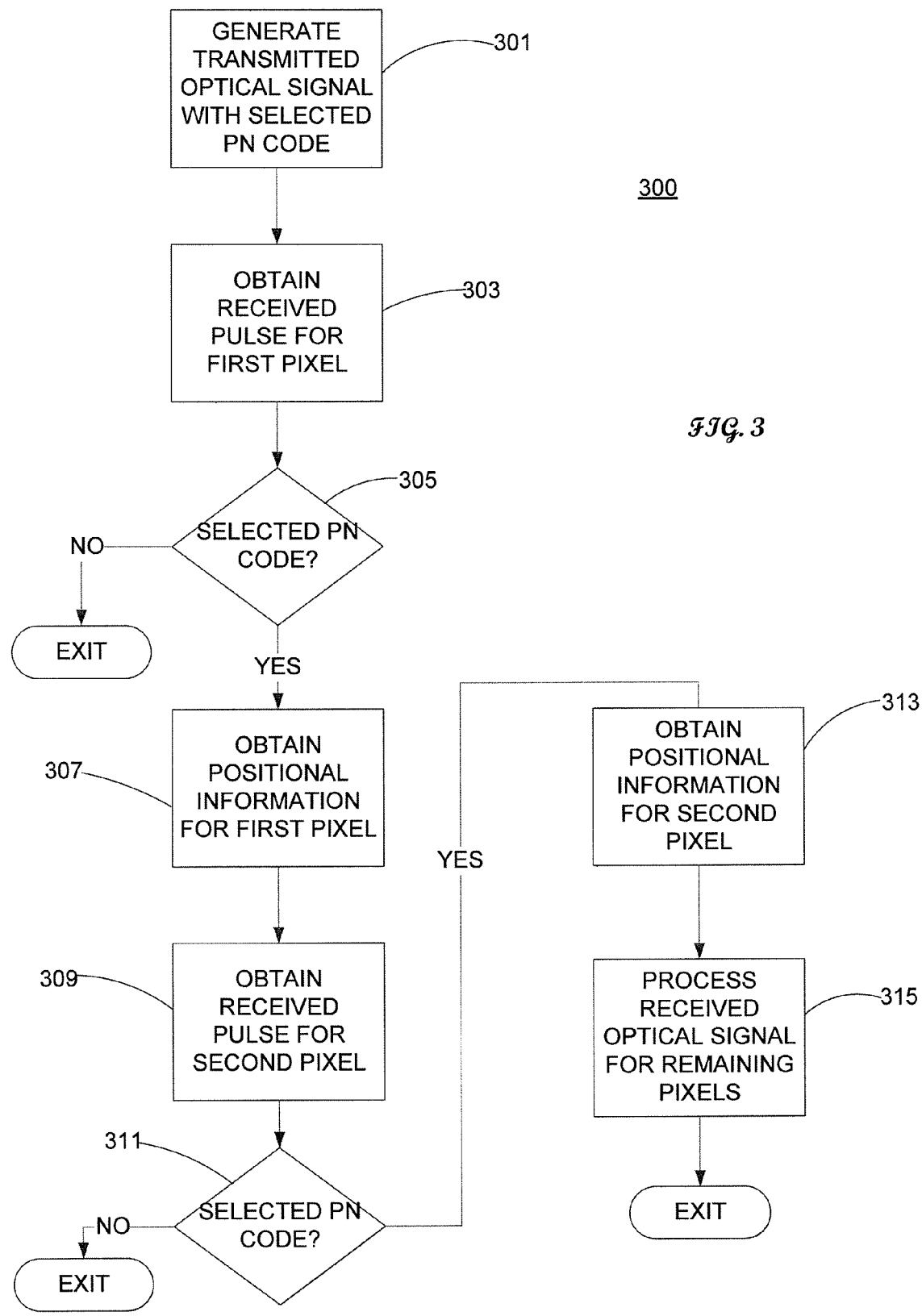
FIG. 3 shows a flow diagram for processing a received optical signal in accordance with an embodiment of the invention.

FIG. 3 shows flow diagram 300 for processing received optical signal 801 in accordance with an embodiment of the invention. In step 301, imaging system 200 generates transmitted optical signal 601 that spans (illuminates) a desired target space. Transmitted optical signal 601 is reflected by one or more objects in the target space, and received optical signal 701 is processed by imaging system 200. Imaging system 200 processes received optical signal 701 on a per pixel basis by selecting a pixel of the received image through demultiplexing circuitry (corresponding to X-selection and Y-selection controls of image array 211).

In step 303, image 303 derives a received pulse for the first pixel and determines whether the received PN code equals the selected PN code of transmitted optical signal 601. Process 300 provides a degree of immunity to interference. For example, other source vehicles may be illuminating an approximate target space but with a different PN code. In addition, a target vehicle may be equipped with apparatus that provides countermeasures to the operation of imaging system 200. If step 305 determines that the received PN code does not equal the selected PN code, imaging system 200 indicates an invalid image detection.

When the received PN code equals the selected PN code, first positional information for the first pixel is obtained in step 307. For example, a range estimate of the target vehicle is determined from a delay of the received pulse with respect to the transmitted pulse. Also, a velocity estimate of the target vehicle with respect to the source vehicle may be determined from the Doppler frequency.

In step 309, received optical signal 801 is processed for a second pixel, which may not be adjacent to the first pixel. In step 309, a corresponding pulse is derived for the second pixel, and the received PN code is compared to the selected PN code in step 311. (While the exemplary embodiment shown in FIG. 3 shows that the received PN code is compared with the selected PN code for each pixel, some embodiments may process the received PN code only for one of the pixels.) When the received PN code equals the selected PN code, step 313 obtains the second positional information for the second pixel.

With embodiments of the invention, if the first positional information is sufficiently different from the second positional information and the first and second pixels correspond to a sufficiently large spatial separation, imaging system 200 determines that a second object (e.g., a second target vehicle) is present within the target space. For example, if the first positional information includes ranging and/or velocity information that is sufficiently different from the ranging and/velocity information of the second positional information, imaging system 200 may indicate that multiple objects are within the target space. If that is the case, imaging system 200 may include an indication (e.g., a text message informing the user of multiple objects) in a user output display (not shown in FIG. 2.) However, imaging system 200 may indicate an invalid image detection if the corresponding spatial separation is not sufficiently large to span multiple objects.

With embodiments of the invention, if the first positional information is sufficiently similar to the second positional information, the positional information may be combined (e.g., averaging the ranging estimates and/or velocity estimates) to obtain combined positional information for the first and second pixels.

In step 315, imaging system 200 continues to process the received optical signal 801 for the remaining pixels in a similar matter as for the first and second pixels (steps 303-313).

Typical system parameters for military or robotic applications are estimated as follows:

Laser Output Power=10 watts continuous (40 dBm)
Wavelength=910 nm or 850 nm or 1550 nm
Pulse Duration=15 nsec.
Emitted Beam Angle: Azimuth=20°
Elevation=12°
Detector Sensitivity<1 µamp/µwatt
Distance Range=5 to 100 m
Range Resolution<1 cm System Temperature range=−45° C. to 125° C.

Power Consumption=15 watts @ 28 volts nominal

Imaging system 200 may support different spread spectrum techniques including direct-sequence spread spectrum, frequency-hopping spread spectrum, and time-hopping frequency spectrum in order to obtain positional information on a per pixel basis. By expanding the frequency spectrum of signal 251, imaging system 200 determines positional information from received signal 253 on a per pixel basis.

Figure 4:
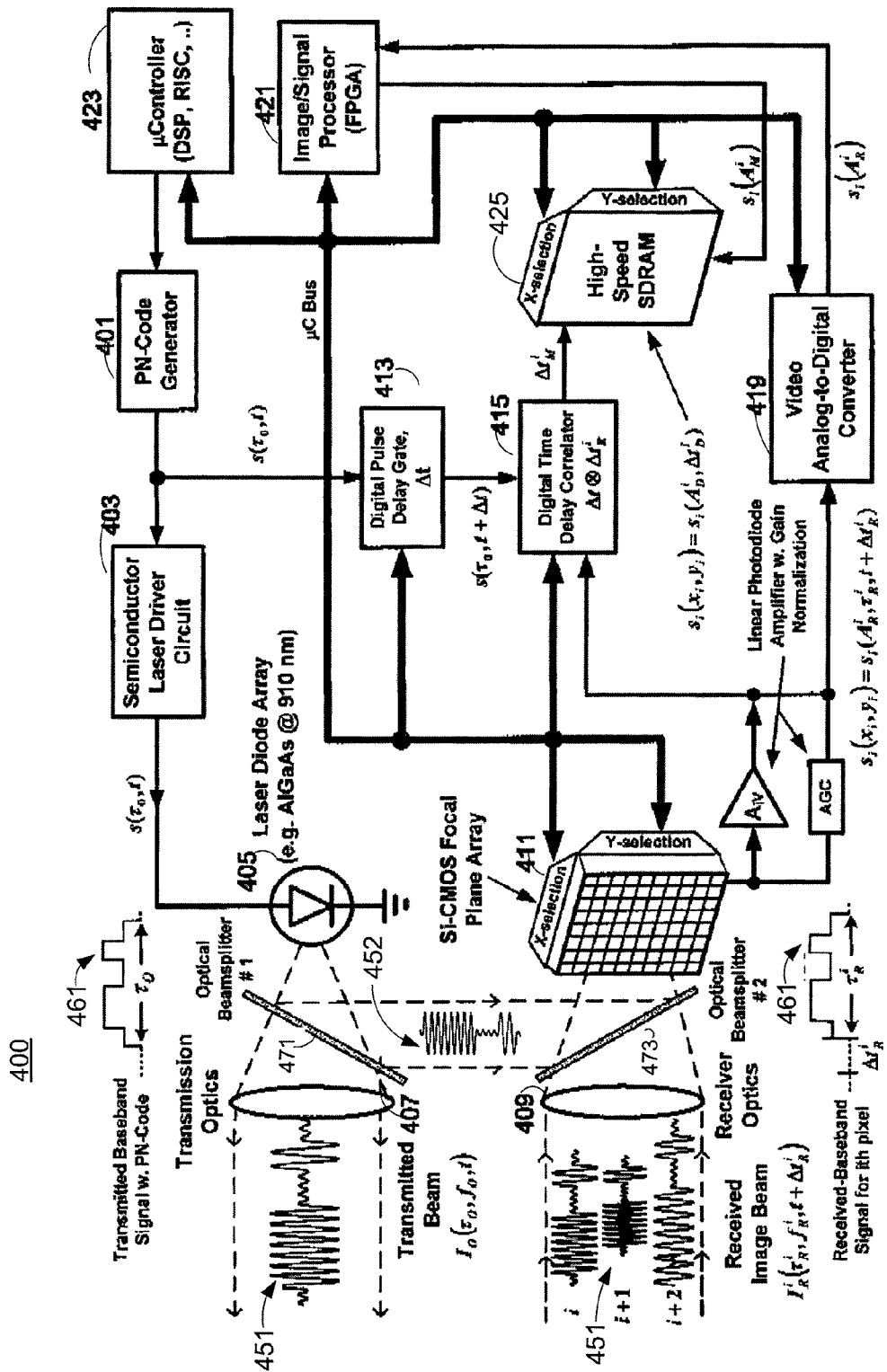
FIG. 4 shows a second architecture of an imaging system in accordance with an embodiment of the invention.

FIG. 4 shows an architecture of imaging system 400 in accordance with an embodiment of the invention. Reflected optical signal 453 is heterodyned (mixed) with reference optical signal 452. The embodiment shown uses beamsplitters 471 and 473, which may be either half-silvered mirrors or dielectrically-coated glass plates. Other methods of splitting the optical illumination beam may be deployed including randomized fiber-optic bundles with bifurcated fibers. The heterodyning occurs at the photodiodes (square-law detectors) of CMOS camera 411. The "image" produced over the entire FPA in this case is really a holographic image which has the Doppler shift encoded into the pixel intensity. This is detected as a signal amplitude with the pixel intensity given as:

$$I_i = I_O + I_R^i + 2(I_O I_R^i)^{\frac{1}{2}} \cos(2\pi(f_R^i - f_O)t + (\varphi_R^i - \varphi_O))$$ EQ. 10 where, $\phi_R^i$ is the phase of the received optical intensity, and, $\phi_O$ is the phase of the transmitted beam.

Comparing FIGS. 2 and 4, elements 401-415, 419, and 421 correspond to elements 201-215, 219, and 221, and signals 461, 451, 453, and 463 correspond to signals 261, 251, 253, and 263, respectively. However, system 400 does not utilize a pulse width comparator as with system 200 (i.e., digital pulse width comparator 217). Rather, imaging system 400 determines the Doppler shift (associated with the change of the pulse width) from EQ. 10.

Figure 5:
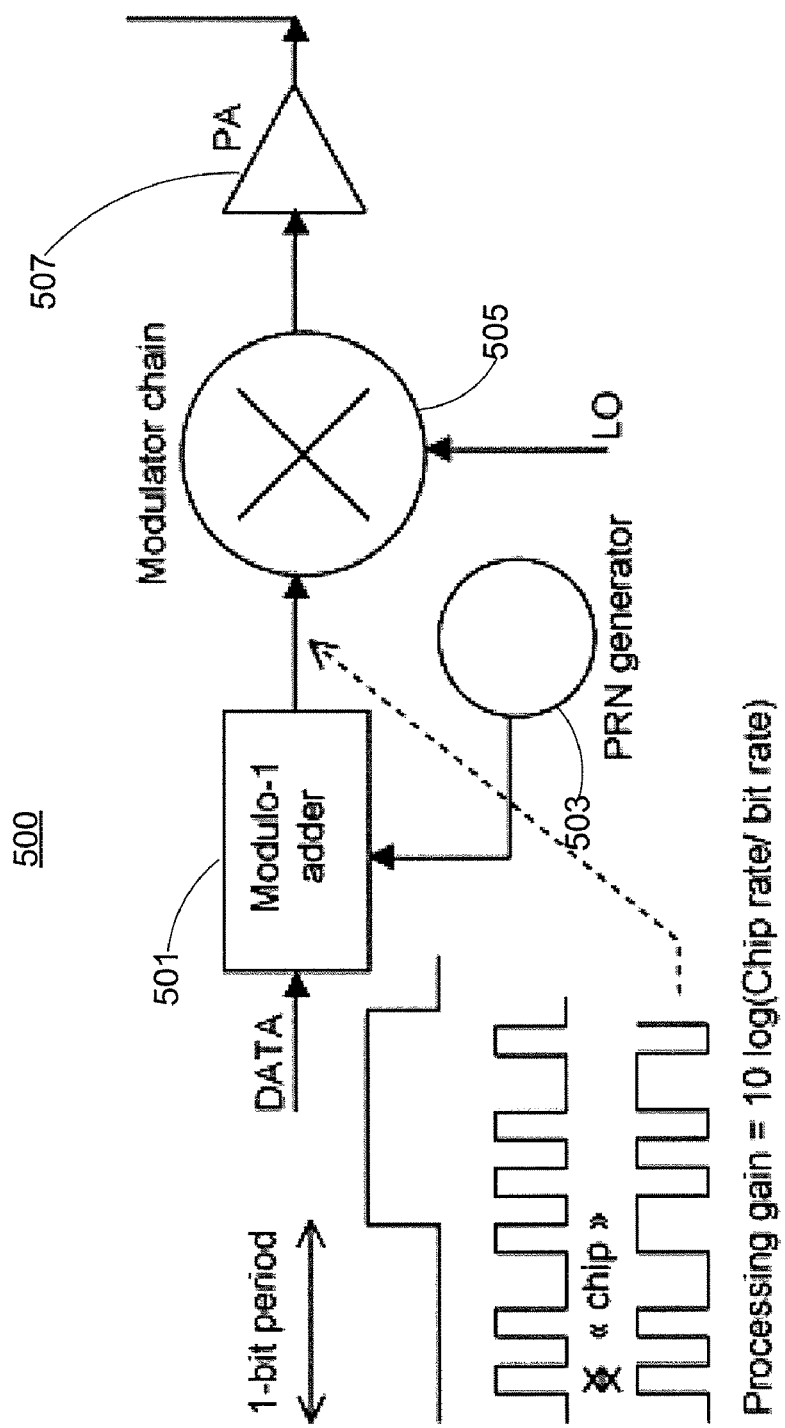
FIG. 5 shows a generator of a direct-sequence spread spectrum (DSSS) signal in accordance with an embodiment of the invention.

FIG. 5 shows generator 500 of a direct-sequence spread spectrum (DSSS) signal in accordance with an embodiment of the invention. PRN (psuedo-random noise) generator 503 generates the selected PN code, which is exclusive-ored to input data by XOR adder 501 to spread (increase) the frequency spectrum of the resulting signal. With the embodiments shown in FIGS. 2, 7 and 8, the input data is typically set to a single "0" bit or "1" bit (i.e., known a priori) so that the resulting baseband output corresponds to the selected PN code. However, embodiments of the invention support input data with a plurality of input bits that may represent a vehicle identification for additional robustness. For example, a traffic-congested highway with a plurality of vehicles having collision-avoidance systems may experience scenarios in which a PN code is unintentionally used by more than one automobile.

The baseband output subsequently modulates the transmitted optical signal through modulator 505. In this technique, the PRN sequence is applied directly to data entering the carrier modulator. The modulator therefore sees a much larger transmission rate, which corresponds to the chip rate of the PRN sequence. The result of modulating an RF carrier with such a code sequence is to produce a direct-sequence-modulated spread spectrum with $((\sin x)/x)^2$ frequency spectrum, centered at the carrier frequency. The optical signal is amplified by amplifier 507 to obtain the desired power level for transmission through transmission lens 207 (shown in FIG. 2). The main lobe of the resulting spectrum (null to null) has a bandwidth twice the clock rate of the modulating code, and the sidelobes have null-to-null bandwidths equal to the PN code's clock rate.

FIG. 6 shows a generator 600 for a frequency-hopping spread spectrum (FHSS) signal in accordance with an embodiment of the invention. PRN generator 601 generates the selected PN code, which causes frequency synthesizer 603 to change the optical carrier frequency. Modulator 605 modulates input data (typically set to either a single "0" or "1" bit). Frequency-hopping causes the optical carrier to hop from frequency to frequency over a wide band according to a sequence defined by the selected PN code. Frequency hopping may occur within an image or between images. For example, frequency synthesizer 603 may change the carrier frequency during duration $\tau_O$, during which imaging system 200 is illuminating the target space. The carrier frequency typically changes in accordance with selected PN code.

The transmitted spectrum of a frequency hopping signal is quite different from that of a direct sequence system. Instead of a $((\sin x)/x)^2$-shaped envelope, the frequency hopper's output is flat over the band of frequencies used. The bandwidth of a frequency-hopping signal is simply N times the number of frequency slots available, where N is the bandwidth of each hop channel.

While not explicitly shown in the figures, embodiments of the invention may support a time-hopping spread spectrum (THSS) signal, in which on and off sequences to a power amplifier are applied in accordance with the selected PN code.

FIG. 7 shows an exemplary transmitted signal in accordance with an embodiment of the invention. Waveforms 701 and 703 correspond to the transmitted and baseband signals, respectively. Baseband signal 703 shows a transmitted pulse having pulse width $\tau_O$ 705 that conveys a selected PN code, comprising "0" PN chips (e.g., chip 707) and "1 PN chips (e.g., chip 709). When a "1" chip is transmitted, the optical carrier is modulated at a predetermined frequency. When "0" chip is transmitted, the optical carrier may be unmodulated or modulated at a different predetermined frequency. The exemplary PN code shown in FIG. 7 contains 14 chips, corresponding to 16,384 possible code sequences and offering a very high discrimination against optical background noise or other active coded signals. PN coding is a type of DSSS (direct sequence spread spectrum as shown in FIG. 5) modulation which spreads the signal across the frequency band up to the noise level.

FIG. 8 shows an exemplary received signal in accordance with an embodiment of the invention. When the corresponding PN code is determined to be the selected PN code (as determined from the correlation function in FIG. 9), imaging system 200 processes the baseband signal 803 from received optical signal 801 to form an image with the positional information on a per pixel basis. Received optical signal 801 will be altered with respect to transmitted optical signal 701 by a Doppler frequency shift when target vehicle 103 is moving relative to source vehicle 101. With this example, source vehicle 101 and target vehicle 103 are approaching each other, resulting in a positive Doppler frequency shift, where the optical carrier frequency is altered by $f_R = f_O + \Delta f_D$. Consequently, pulse width $\tau_R$ 805, is decreased with respect to transmitted pulse width $\tau_O$ 705, and the predetermined frequency for modulating a "1" chip is increased by the Doppler frequency. The velocity for the $i^{th}$ pixel may be determined from EQ. 5 as:

$$v^i_{REL} = \Delta f_D \left(\frac{c}{2f_O}\right) = \left(\frac{f_R^i - f_O}{f_O}\right)\left(\frac{c}{2}\right) = \left(\frac{\left(\frac{f_O \tau_O}{\tau_R^i}\right) - f_O}{f_O}\right)\left(\frac{c}{2}\right) \quad \text{EQ. 11}$$

One can express $$\tau_O = k\lambda_O = \frac{c}{f_O} \text{ and, } \tau_R^i = k\lambda_R^i = \frac{c}{f_R^i},$$

such that the Doppler change in wavelength is proportional to the change in the Pulse Width, $\tau_R^i$. With respect to FIG. 2, the output of the comparator 215 would yield the ratio of the source pulse width, to the received pulse width, i.e., $$\beta_M^i = \frac{\Delta \tau_O}{\Delta \tau_R^i},$$

where the M denotes the measured or correlated parameter. EQ. 11 becomes, for the $i^{th}$ pixel, $$v^i_{REL} = \left(\frac{f_O(\beta_M^i - 1)}{f_O}\right)\left(\frac{c}{2}\right) = (\beta_M^i - 1)\left(\frac{c}{2}\right) \quad \text{EQ. 12}$$

For the range, gating from the Time Delay Correlator 215 yields $\Delta t_M^i$, and a measurement of the range variable of:

$$R_i = \frac{c \Delta t_M^i}{2} \quad \text{EQ. 13}$$

for the distance or range to the $i^{th}$ pixel object in the object field.

FIG. 9 shows an exemplary correlation result for a received DSSS signal in accordance with an embodiment of the invention. Pulse width correlator 215 and time delay correlator 217 (as shown in FIG. 2) also receive a "delayed" version of s(τ₀,t), which is used to perform a "sliding peak" correlation technique as shown in FIG. 9. If the peak autocorrelation value is sufficiently large, then system 200 determines that the corresponding PN code is equal to the selected PN code (i.e., the PN code that modulates transmitted optical signal 111). The results are digitized by a high-speed ADC (analog-to-digital converter) and sent to image processor 221 to generate final pixel data for imaging system 200.

Figure 10:
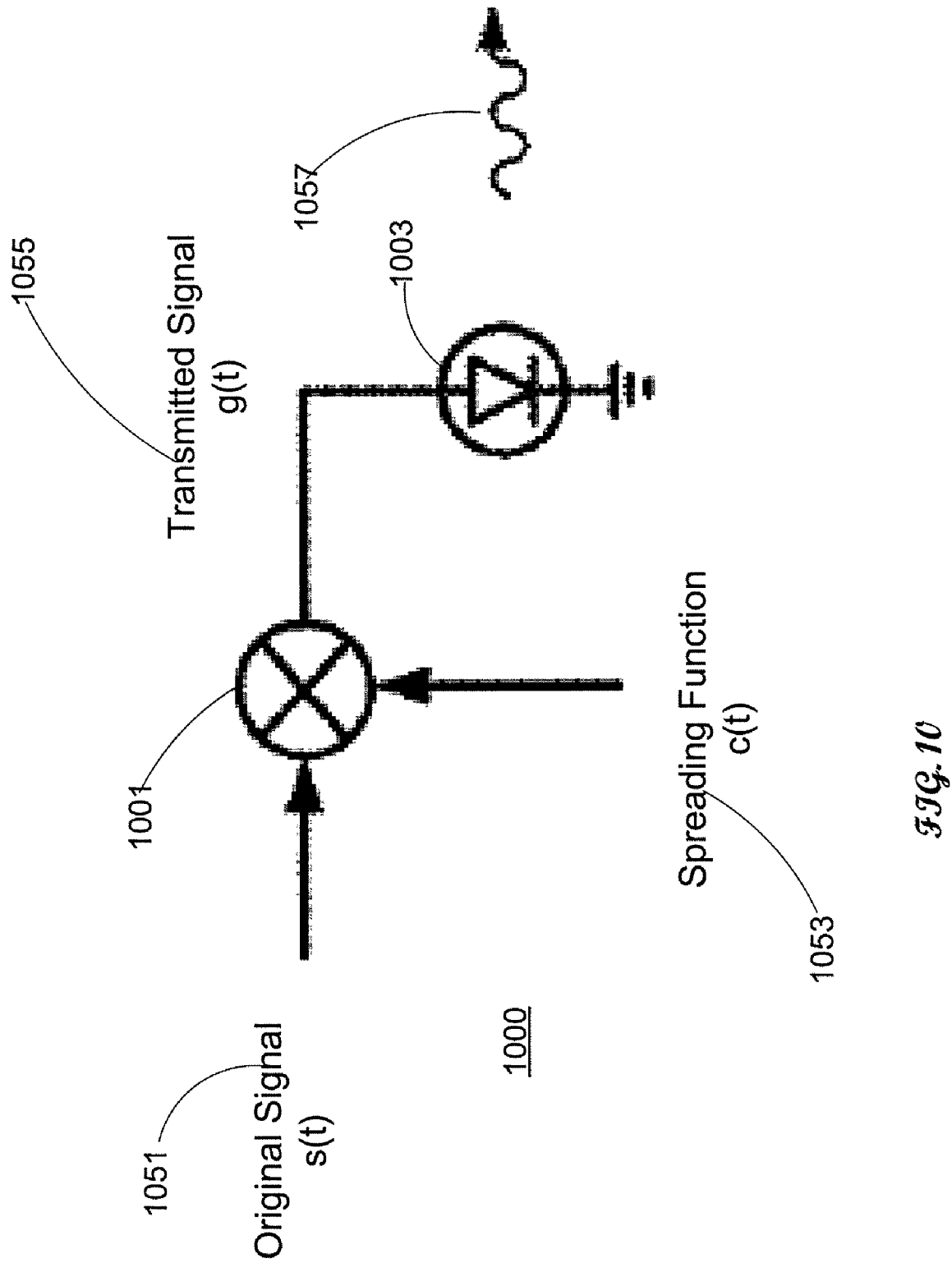
FIG. 10 shows an architecture for spreading a DSSS signal in accordance with an embodiment of the invention.

FIG. 10 shows architecture 1000 for spreading a DSSS signal in accordance with an embodiment of the invention. Input signal 1051, which comprises a transmitted pulse as shown in FIG. 7, is modulated by spreading function 1053 (i.e., the selected PN code) through modulator 1001 to generate transmitted signal 1055. Signal 1055 activates laser diode array 1003 to generate transmitted optical signal 1057. As shown in FIG. 7, a modulated signal rides on top of the transmitted pulse; however, the transmitted pulse may be turned on and off in accordance with transmitted signal 1055, causing the illumination of laser diode array 1003 to turn on and off during the transmitted pulse.

Figure 11:
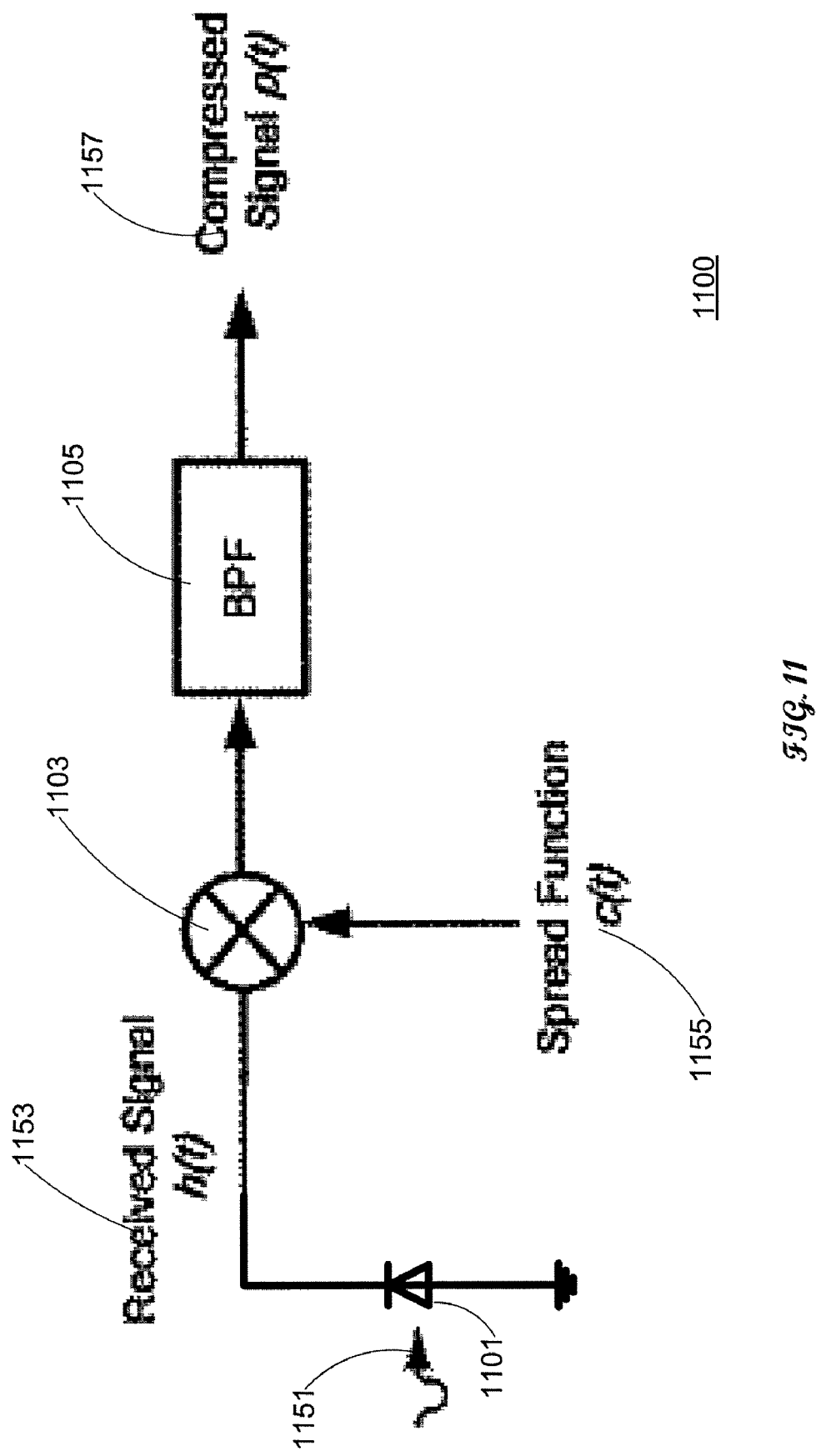
FIG. 11 shows an architecture for de-spreading a DSSS signal in accordance with an embodiment of the invention.

FIG. 11 shows architecture 1100 for de-spreading a DSSS signal in accordance with an embodiment of the invention. Received optical signal 1151 is "de-spread" by the correlator circuit 1103 by applying PN code 1155 to the detected signal 1153 from diode array 1101. (With embodiments of the invention, the output of photodetector 1101 corresponds to the digital baseband signal shown in FIG. 8. A coded signal has an intensity modulated onto to it at each pixel which is further modulated by the reflection off objects within the FOV.) The resulting signal from correlator circuit 1103 is further processed by bandpass filter 1105 to properly shape the signal, providing compressed signal 1157 for further processing by imaging system 200 to obtain the image pixel and the positional information.

Referring to FIG. 2, laser array 205 is pulsed in order to provide enough range and resolution while maintaining the system at an "eye-safe" level for personnel outside the vehicle. With embodiments of the invention, laser array 205 is beam-expanded to span the FOV, where the illumination is "eye-safe". Cooling of the laser-diode may involve Peltier devices or some kind of thermal stabilization to keep the center frequency and lineshape stable. An optical pulse propagates through the atmosphere, because of diffraction, dispersion and atmospheric absorption and scattering losses, the return pulse may have a widened pulse-width, with slower rise times. Hence, imaging system 200 may "measure" a pulse which is broadened into a Gaussian profile. The extent to which this occurs may have a significant impact on the measured pulse-width. Also, the optical bandwidth is distinguished from the electrical bandwidth. As one is often concerned with the electrical bandwidth, one may assume that each pixel photodiode is a quantum, square-law converter and converts the optical energy to an electrical current in accordance with:

$$i_{PD} = \frac{\eta e P_{OPT} \lambda_0}{hc} = \frac{\eta e P_{OPT}}{\hbar \omega} \quad \text{EQ. 13}$$

where $i_{PD}$ is the photodiode current, $P_{OPT}$ is the optical power, h is Planck's constant, e is the electronic charge, η is the quantum efficiency, $\lambda_0$ is the transmitter wavelength, c is the speed of light in the atmosphere, and ω is the optical carrier frequency. Therefore a 3-dB drop in optical power results in a 6-dB drop in electrical power. Thus, the electrical bandwidth $f_{3DB}^{ELEC}$ is the frequency at which the optical power is $1/\sqrt{2}$ times the D.C. value. Hence, $f_{3DB}^{ELEC}$ is given by:

$$f_{3\,dB}^{ELEC} = \frac{0.13}{\Delta \tau_{PULSE}} \quad \text{EQ. 14}$$

One notes that $\Delta\tau_{PULSE}$ is the dispersion in the pulse width and is added to $\Delta\tau_D$, corresponding to the Doppler shift in the pulse-width.

As discussed above, some embodiments of the invention support the following capabilities:

Creates a full field image of the LIDAR data on a per pixel level basis: Prior art imaging systems typically use a plurality of pixels to compute LIDAR data (ranging and/or velocity estimates) from several or perhaps a line of pixels. For example, LIDAR data may be obtained from an average of image scene pixels from forward-looking capacity.

Circumventing heterodyning: By measuring the correlation of the pulse width with an electronic version of the reference pulse, one may circumvent the complexities associated with externally heterodyning using beam splitters and associated optics. Prior art imaging systems may add a pulse train modulation on top of the single TOF pulse in order to reduce the difficulty of trying to measure the difference harmonics at 10 to 100 Terahertz (i.e., Doppler shift in frequency).

As can be appreciated by one skilled in the art, a computer system with an associated computer-readable medium containing instructions for controlling the computer system can be utilized to implement the exemplary embodiments that are disclosed herein. The computer system may include at least one computer such as a microprocessor, microcontroller, digital signal processor, and associated peripheral electronic circuitry.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

We claim:

1. An imaging system, comprising:
a transmitting module configured to transmit a transmitted optical signal containing a transmitted pulse, the transmitted pulse being modulated with a selected pseudo-noise (PN) code, the transmitted optical signal arranged to illuminate a target space containing a first object, wherein the transmitting module is configured to include identification information in addition to the selected PN code, the identification information is contained in the transmitted optical signal, the identification information comprises a plurality of bits that represent a source identification of the selected PN code, and the source identification comprises a vehicle identification;
a receiving module configured to receive a reflected optical signal reflected from the first object and to derive a first received pulse from the reflected optical signal;
an optical array configured to detect a detected signal from the reflected optical signal across a plurality of pixels of the optical array, the detected signal spanning the target space, a first pixel being contained in the plurality of pixels; and
a processing module configured to process data for the plurality of pixels by:
determining first pulse characteristics of the first received pulse;
obtaining first positional information for the first object from the first pulse characteristics;
when the selected PN code is detected from the first pixel, providing first image information and the first positional information for the first object; and
discarding second pixel data for a second pixel when a PN code associated with the second pixel is different from the selected PN code, wherein the PN code associated with the second pixel is generated by a source that is different from the transmitting module that is associated with the selected PN code.

2. The imaging system of claim 1, the processing module further configured to obtain the first positional information by determining a first velocity estimate of the first object only from the first pulse characteristics.

3. The imaging system of claim 1, the processing module further configured to process the second pixel data for the second pixel by:
determining second pulse characteristics of a second received pulse for the second pixel, the second received pulse being derived from the reflected optical signal;
obtaining second positional information for a second object from the second pulse characteristics, the second positional information being sufficiently different from the first positional information, the target space containing the second object; and
when the selected PN code is detected from the second pixel, providing second image information and the second positional information for the second object.

4. The imaging system of claim 3, the processing module further configured to provide an indication that distinguishes the first object from the second object.

5. The imaging system of claim 3, the processing module further configured to obtain the second positional information by determining a second range estimate and a second velocity estimate of the second object from the second pulse characteristics.

6. The imaging system of claim 1, the processing module further configured to process the second pixel data for the second pixel by:
determining second pulse characteristics of a second received pulse, the second received pulse being derived from the reflected optical signal;
obtaining second positional information for the first object from the second pulse characteristics, the second positional information being essentially equal to the first positional information; and
when the selected PN code is detected from the second pixel, providing second image information for the first object.

7. The imaging system of claim 6, the processing module further configured to process the data by:
determining combined positional information from the first positional information and the second positional information; and
providing the second image information with the combined positional information.

8. The imaging system of claim 7, wherein the processing module is configured to average the first and second positional information to obtain the combined positional information.

9. The imaging system of claim 1, the processing module further configured to process the data for the plurality of pixels by:
correlating the first pulse characteristics of the first received pulse and the transmitted pulse to obtain a time delay and a pulse width of the received pulse; and
processing the reflected optical signal in accordance with the time delay and the pulse width.

10. The imaging system of claim 1, the optical array comprising a charge-coupled device (CCD) array.

11. The imaging system of claim 1, the optical array comprising a complementary metal-oxide semiconductor (CMOS) array.

12. The imaging system of claim 1, the transmitting module comprising a frequency hopping spread spectrum modulator.

13. The imaging system of claim 1, the transmitting module comprising a direct sequence spread spectrum (DSSS) modulator.

14. The imaging system of claim 1, the transmitting module comprising a time hopping spread spectrum modulator.

15. The imaging system of claim 1, the optical array configured to heterodyne an optical reference signal with the reflected optical signal.

16. The imaging system of claim 15, the transmitting module comprising an optical extractor extracting a portion of the transmitted optical signal to provide the optical reference signal.

17. The imaging system of claim 1, wherein the processing module is configured to discard third pixel data for a third pixel when received identification information in the third pixel data is different from the identification information.

18. The imaging system of claim 17, wherein a third pixel PN code associated with the third pixel equals the selected PN code.

19. The imaging system of claim 1, the processing module further configured to obtain the first positional information by determining a first range estimate of the first object from the first pulse characteristics.

20. A method for forming an image of a target space, comprising:
   transmitting an optical signal that illuminates the target space and contains a transmitted pulse modulated with a selected pseudo-noise (PN) code, the target space containing a first object;
   receiving a reflected optical signal reflected from the first object and deriving a first received pulse from the reflected optical;
   detecting a detected signal from the reflected optical signal across a plurality of pixels of an input optical array, the detected signal spanning the target space, a first pixel being contained in the plurality of pixels; and
   processing data for the plurality of pixels by:
   determining first pulse characteristics of the first received pulse;
   obtaining first positional information for the first object from the first pulse characteristics; and
   when the selected PN code is detected from the first pixel, providing first image information and the first positional information for the first object;
   discarding second pixel data for a second pixel when a PN code associated with the second pixel is different from the selected PN code, wherein the PN code associated with the second pixel is generated by a source that is different from a transmitting module that is associated with the selected PN code; and
   discarding third pixel data for a third pixel when received identification information is different from the identification information and a third pixel PN code associated with the third pixel matches the selected PN code, wherein the identification information is contained in the transmitted optical signal and comprises a plurality of bits that represent a source identification of the selected PN code.

21. The method of claim 20, wherein the obtaining the first positional information comprises:
   determining a first range estimate and a velocity estimate of the first object only from the first pulse characteristics.

22. The method of claim 20, further comprising:
   processing the second pixel data for the second pixel by:
   determining second pulse characteristics of a second received pulse, the second received pulse being derived from the reflected optical signal;
   obtaining second positional information for a second object from the second pulse characteristics, the second positional information being sufficiently different from the first positional information, the target space containing the second object; and
   when the selected PN code is detected from the second pixel, providing second image information and the second positional information for the second object.

23. The method of claim 22, further comprising:
   providing an indication that distinguishes the first object from the second object.

24. The method of claim 22, wherein the obtaining the second positional information comprises further comprising:
   determining a second range estimate and a second velocity estimate of the second object from the second pulse characteristics.

25. The method of claim 20, further comprising:
   processing the second pixel data for the second pixel by:
   determining second pulse characteristics of a second received pulse, the second received pulse being derived from the reflected optical signal;
   obtaining second positional information for the first object from the second pulse characteristics, the second positional information being essentially equal to the first positional information; and
   when the selected PN code is detected from the second pixel, providing second image information for the first object.

26. The method of claim 25, further comprising:
   determining combined positional information from the first positional information and the second positional information; and
   providing the second image information with the combined positional information.

27. The method of claim 20, wherein the processing further comprises:
   correlating the first pulse characteristics of the first received pulse and the transmitted pulse to obtain a time delay and a pulse width of the received pulse; and
   processing the reflected optical signal in accordance with the time delay and the pulse width.

28. The method of claim 20, further comprising:
   repeating the transmitting, the receiving, the detecting, and the processing for another pixel from the plurality of pixels.

29. The method of claim 28, further comprising:
   presenting an image with the plurality of pixels, each pixel being associated with corresponding positional information.

30. The method of claim 20, further comprising:
   bypassing the processing and routing the detected signal to an optical display when activating night vision operation.

31. An imaging system, comprising:
   a transmitting module configured to transmit a transmitted optical signal containing a transmitted pulse modulated with a selected pseudo-noise (PN) code using a direct sequence spread spectrum (DSSS) technique, the transmitted optical signal illuminating a target space containing an object;
   a receiving module configured to receive a reflected optical signal reflected from the object and deriving a received pulse from the reflected optical signal;
   an optical array configured to detect a detected signal from the reflected optical signal across a plurality of pixels of the optical array, the detected signal spanning the target space, a processed pixel being contained in the plurality of pixels; and
   a processing module configured to process data for the processed pixel by:
   determining pulse characteristics of the received pulse;

correlating the pulse characteristics of the received pulse and the transmitted pulse to obtain a time delay and a pulse width of the received pulse;

processing the reflected optical signal in accordance with the time delay and the pulse width to obtain a range estimate and a velocity estimate for the object;

when the selected PN code is detected from the processed pixel, providing image information and the range estimate and the velocity estimate for the object;

when an associated PN code from the processed pixel is different from the selected PN code, discarding the image information, wherein the associated PN code is generated by a source that is different from the transmitting module that is associated with the selected PN code; and discarding third pixel data for a third pixel when received identification information is different from the identification information and a third pixel PN code associated with the third pixel matches the selected PN code, wherein the identification information is contained in the transmitted optical signal and comprises a plurality of bits that represent a source identification of the selected PN code.

* * * * *